United States Patent
Hamakawa et al.

(10) Patent No.: US 6,515,837 B1
(45) Date of Patent: Feb. 4, 2003

(54) MAGNETORESISTIVE HEAD AND MAGNETIC STORAGE APPARATUS

(75) Inventors: Yoshihiro Hamakawa, Odawara (JP); Shiroyasu Odai, Odawara (JP); Katsumi Hoshino, Matsuda (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 09/662,643

(22) Filed: Sep. 15, 2000

(30) Foreign Application Priority Data

Mar. 14, 2000 (JP) ........................... 2000-069622

(51) Int. Cl.$^7$ ................................ G11B 5/39
(52) U.S. Cl. ...................................... 360/319
(58) Field of Search ........................... 360/319

(56) References Cited

U.S. PATENT DOCUMENTS 4,783,711 A * 11/1988 Kitada et al. ............... 360/128
6,025,978 A *  2/2000 Hoshi et al. ................ 360/319
6,275,360 B1 *  8/2001 Nakamoto et al. .......... 360/317

FOREIGN PATENT DOCUMENTS

JP       61258323 A  * 11/1986
JP       09091625 A  *  4/1997

OTHER PUBLICATIONS

Y. Hamakawa et al, "Spin–Valve Heads Utilizing Antiferromagnetic NiO Layers", IEEE Transactions on Magnetics, vol. 32, No. 1, Jan. 1996, pp. 149–155.

Y. Hamakawa et al, "Spin–Valve Heads Using CrMnPt Antiferromagnetic Films", IEEE Transactions on Magnetics, vol. 35, No. 2, Mar. 1999, pp. 677–682.

* cited by examiner

*Primary Examiner*—William Klimowicz
(74) *Attorney, Agent, or Firm*—Mattingly, Stanger & Malur, P.C.

(57) ABSTRACT

There is provided a magnetoresistive head which is capable of suppressing the fluctuation of read output while ensuring a sufficient dielectric breakdown voltage of the shielding portions by constituting the shielding portions with a Co-based material. Namely, the lower shield film is formed of a 2-ply composite film wherein the film (12') of the lower shield film which is disposed contacting with the lower gap insulation film (13) is constituted by an amorphous soft magnetic film, while the film (12) which is disposed away from the lower gap insulation film is constituted by a crystalline soft magnetic film, thereby making it possible to suppress the fluctuation of read output even if the gap is narrowed without deteriorating the yield relative to the dielectric breakdown.

13 Claims, 6 Drawing Sheets

MAGNETORESISTIVE HEAD AND MAGNETIC STORAGE APPARATUS

BACKGROUND OF THE INVENTION

The present invention relates to a magnetoresistive head which is capable of coping with high density magnetic recording, and also to a magnetic storage apparatus.

Figure 2:
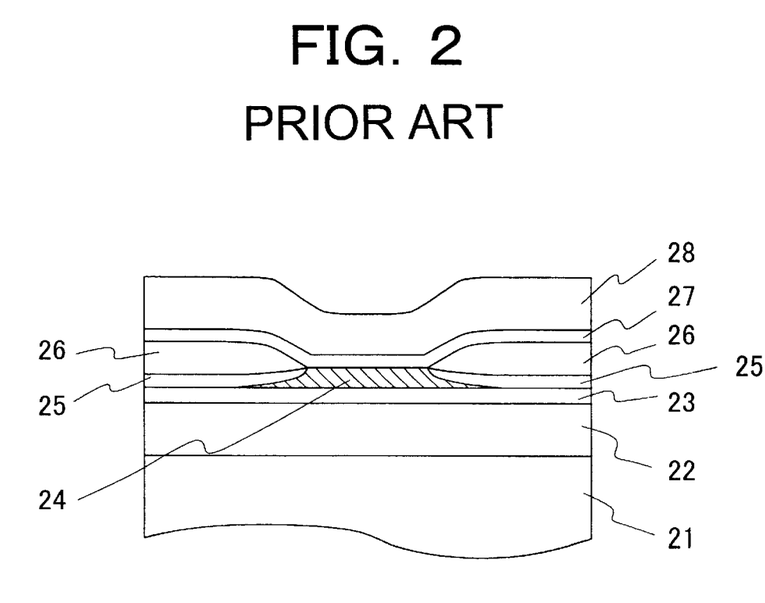
FIG. 2 is a cross-sectional view schematically illustrating a magnetoresistive head according to the prior art as it is viewed from the face thereof facing a recording medium.

In the conventional magnetic recording disk drive, a read/write separation type head is employed wherein the recording is performed using an inductive thin film head, while the read back is performed using a magnetoresistive head. This magnetoresistive head takes advantage of a magnetoresistive effect or a phenomenon that electric resistance varies depending on the external magnetic field, and is constructed, as shown in FIG. 2, comprising a substrate 21, on which a magnetoresistive element consisting of a magnetoresistive film 24, a domain control film 25 and electrodes 26; upper and lower shield films 22 and 28 for interrupting unnecessary magnetic field; and gap insulation films 23 and 27 for isolating the magnetoresistive element from the shield films 22 and 28 are mounted. As for the material for the gap insulation films 23 and 27, an $Al_2O_3$ film or an $SiO_2$ film is predominantly employed. As for the material for the lower shield film 28 on the other hand, an NiFe-based alloy film such as $Ni_{80}Fe_{20}$ and $Ni_{46}Fe_{54}$; an FeAlSi-based alloy film; or Co-based amorphous film such as CoTaZr, CoNbZr and CoMoZr is conventionally employed (IEEE Transaction on Magnetics, Vol.32, No.1, January 1996, pp.149–155. HAMAKAWA et al., "spin-valve heads utilizing antiferromagnetic NiO layer"; or IEEE Transaction on Magnetics, Vol.35, No.2, March 1997, pp.149–155. HAMAKAWA et al., "spin-valve heads using CrMnPt antiferromagnetic films").

Due to the recent trend to further enhance the density of magnetic recording, it is required to make narrower the interval between the lower shield film and the upper shield film for the purpose of enhancing the resolution of the magnetoresistive head. Therefore, it is required that the gap insulation film is formed thinner. In this case, there is a problem that if the dielectric strength of the gap insulation film is too low, short-circuit may be caused to occur between the magnetoresistive film or electrodes and the shield films. As mentioned above, although an $Al_2O_3$ film or an $SiO_2$ film is mainly employed for the gap insulation film, if the film thickness thereof is made as thin as 50 nm or less, the properties of the film would be greatly influenced by the roughness of the film or the pin-hole that may be formed in the film, thereby sharply deteriorating the dielectric strength of the gap insulation film.

It has been made clear through the experiments conducted by the present inventors that, as far as the lower gap insulation film is concerned in particular, the magnitude of deterioration of this dielectric strength varies depending on the kinds of the lower shield film. Namely, where the lower shield film is entirely formed of a Co-based amorphous soft magnetic film, it is possible to ensure a sufficient dielectric strength of the lower gap insulation film even if the film thickness of the lower gap insulation film is fairly thinned as compared with the situation where the lower shield film is formed of a crystalline soft magnetic film such as an NiFe alloy film or an FeAlSi alloy film. However, there would be raised another problem when the lower shield film is formed of a Co-based amorphous soft magnetic film that due to the subsequent heat history of head processing, the soft magnetic characteristics of the lower shield film is caused to deteriorate by the changes in magnetic anisotropy of the lower shield film, thereby fluctuating the read output of the head.

The present invention has been made under the aforementioned problems in the prior art, and therefore, an object of the present invention is to provide a magnetoresistive head which is capable of suppressing the fluctuation of read output of the head while ensuring a sufficient dielectric strength of the shielding portions by making use of a Co-based material.

SUMMARY OF THE INVENTION

The present invention has been accomplished as a result of intensive studies on the relationship among the lower shield film, a material for the gap insulation film and dielectric strength.

Namely, the magnetoresistive head according to the present invention is featured in that it comprises a magnetoresistive film; a pair of electrodes connected to both sides of said magnetoresistive film; upper and lower gap insulation films sandwiching said magnetoresistive film therebetween; an upper shield film formed on said upper gap insulation film; and a lower shield film formed below said lower gap insulation film; and that it is characterized in that said lower shield film is formed of a 2-ply structure comprising an amorphous soft magnetic film which is disposed contacting with said lower gap insulation film and a crystalline soft magnetic film which is disposed away from said lower gap insulation film.

Since the lower shield film is formed of a composite film having a 2-ply structure comprising an amorphous soft magnetic film which is disposed to contact with the lower gap insulation film and a crystalline soft magnetic film which is disposed away from the lower gap insulation film as described above, it is possible, even if the film thickness of the lower gap insulation film is fairly thinned, to obtain a magnetoresistive head which is capable of ensuring a sufficient dielectric strength between the lower shield film and the magnetoresistive element, and at the same time, capable of suppressing the fluctuation of read output of the head.

As for the amorphous soft magnetic film for constituting part of the lower shield film, it would be preferable to employ an amorphous film containing Co as a main component, such as CoTaZr, CoNbZr, CoMoZr, CoTaHf, CoNbHf, CoMoHf, etc.

As for the crystalline soft magnetic film for constituting part of the lower shield film, it would be preferable to employ a crystalline film containing Ni and/or Fe as a main component, such as NiFe alloy film and FeAlSi alloy film.

The film thickness of the amorphous soft magnetic film should preferably be in the range of 3 nm to 500 nm.

As for the materials for the lower gap insulation film, either of $Al_2O_3$, $SiO_2$ and a mixture of $Al_2O_3$ and $SiO_2$ can be preferably employed. As for the film thickness of the lower gap insulation film, most prominent effects can be obtained when it is confined to not more than 30 nm.

A read/write separation type head exhibiting an excellent performance can be obtained by combining the aforementioned magnetoresistive head with an inductive thin film head.

The magnetic storage apparatus according to the present invention is featured in that it comprises a magnetic recording medium; a magnetic head for reading and writing data through said magnetic recording medium; a mechanism for positioning said magnetic head to a desired diametral portion over said magnetic recording medium while supporting said magnetic head; and a read/write signal processing system for processing read signals and write signals; and that it is characterized in that said magnetic head is constituted by a read/write separation type head comprising a combination of the aforementioned magnetoresistive head and an inductive thin film head.

According to the present invention, since a region of the lower shield film which is contacted with the lower gap insulation film is constituted by an amorphous soft magnetic film, while the opposite region of the lower shield film which is disposed away from the lower gap insulation film is constituted by a crystalline soft magnetic film, the initial growth of the lower gap insulation film is suppressed to thereby make it excellent in quality even if the film thickness thereof is fairly thin. As a result, the dielectric breakdown of the lower gap insulation film is deemed to be suppressed even if the film thickness thereof is fairly thin. As a matter of fact, even if the film thickness thereof is made as thin as 30 nm or less, a sharp decrease of the dielectric breakdown voltage cannot be recognized, thereby making it possible to provide the magnetic head giving high yield as compared with the case where the conventional single-layer crystalline soft magnetic film is employed. Additionally, when this read head is combined with a recording inductive magnetic head, it becomes possible to obtain a magnetic head or a magnetic storage apparatus, both being capable of coping with high density magnetic recording.

DETAILED DESCRIPTION OF THE INVENTION

Next, various embodiments of the present invention will be explained with reference to drawings.

EXAMPLE 1

Figure 1:
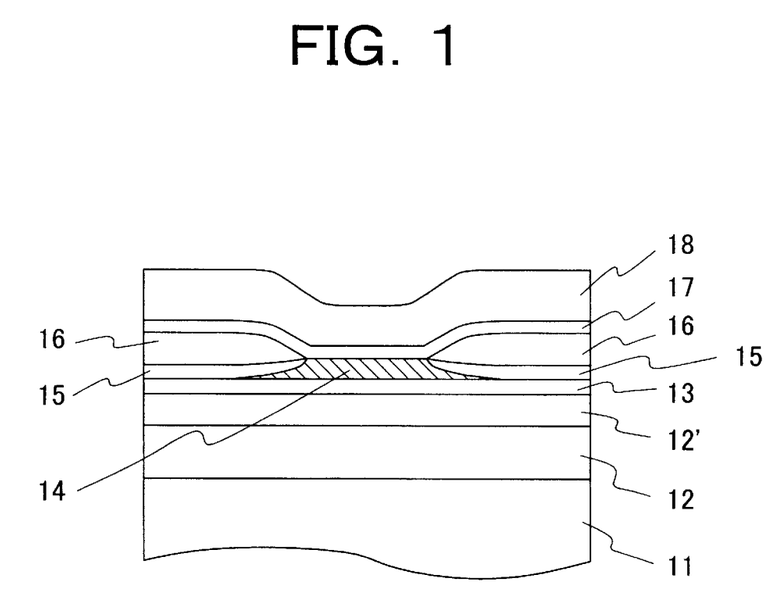
FIG. 1 is a cross-sectional view schematically illustrating one embodiment of magnetoresistive head of the present invention as it is viewed from the face thereof facing a recording medium.

FIG. 1 schematically illustrates one embodiment of magnetoresistive head of the present invention as it is viewed from the floating face thereof. The magnetoresistive head according to the present invention comprises a ceramic substrate 11 such as $Al_2O_3$-TiC, on which a first lower shield film 12 consisting of $Ni_{80}Fe_{20}$ (at.%) alloy film; a second lower shield film 12' consisting of CoNbZr amorphous film; a lower gap insulation film 13 consisting of a mixture of $Al_2O_3$ and $SiO_2$; a magnetoresistive element consisting of a magnetoresistive film 14, electrodes 16 and a domain control film 15; an upper gap insulation film 17 consisting of a mixture of $Al_2O_3$ and $SiO_2$; and an upper shield film 18 consisting of $Ni_{80}Fe_{20}$ alloy film are successively formed. According to the actual magnetic head, although the aforementioned magnetoresistive head is further provided with a recording gap insulation film and a recording magnetic pole, they are omitted herein.

Although the film thickness of the first lower shield film 12 was set to 2 μm, the film thickness of the second lower shield film 12' to t(nm), the film thickness of the lower gap insulation film 13 to d(nm), the film thickness of the upper gap insulation film 17 to 20 nm, and the film thickness of the upper shield film 18 to 3 μm in this example, it should be noted that the film thickness, in particular, of the first lower shield film 12, the upper gap insulation film 17 and the upper shield film 18 is not confined to these values.

Although either a sputtering method or a plating method may be employed as a method of forming the first lower shield film 12, the first lower shield film 12 was formed in this example by means of a high-frequency magnetron sputtering method under the conditions of $1 \times 10^{-7}$ Torr in ultimate vacuum; 3 mTorr in Ar gas pressure; and 300 W in electric power. A mixed gas consisting of Ar and nitrogen may be substituted for the Ar gas employed herein. It is preferable, for the purpose of ensuring the flatness of the film surface, to perform CMP (Chemical Mechanical Polishing) after the formation of the first lower shield film 12. When this CMP treatment is performed, the flatness of film should be such that the difference in height between the top and bottom of the roughness of the film surface is confined to not more than 2 nm as the surface is evaluated by making use of an atomic force microscope (AFM).

The formation of the second lower shield film 12' should preferably be performed by means of a sputtering method such as a high-frequency magnetron sputtering method and an ion beam sputtering method. The second lower shield film 12' was formed in this example by means of a high-frequency magnetron sputtering method under the conditions of $1 \times 10^{-7}$ Torr in ultimate vacuum; 3 mTorr in Ar gas pressure; and 300 W in electric power. The substrate was water-cooled. The lower gap insulation film 13 was formed by means of a high-frequency magnetron sputtering method wherein a composite target consisting of $Al_2O_3$ and $SiO_2$ was employed. The sputtering was performed using a mixed gas comprising Ar and $O_2$ (10%) under the conditions of $1 \times 10^{-7}$ Torr in ultimate vacuum; 3 mTorr in gas pressure; and 500 W in electric power.

As for the magnetoresistive film 14, either a magnetoresistive film which takes advantage of anisotropic magnetoresistive effect or a spin-valve film which takes advantage of giant magnetoresistive effect may be employed. In this example, the spin-valve film which takes advantage of giant magnetoresistive effect was employed. This spin-valve film was constituted by [PtMn(10 nm)/Co(1 nm)/Ru(0.75 nm)/Co(2 nm)/Cu(2.1 nm)/Co(0.5 nm)/NiFe(3 n m)/Ta(3 nm)], wherein the PtMn is disposed close to the substrate and hence the Ta is disposed away from the substrate. This spin-valve film was formed in this example by making use of a high-frequency magnetron sputtering apparatus. The ultimate vacuum inside the chamber of the sputtering apparatus was set to $1 \times 10^{-7}$ Torr, and Ar gas was introduced into the chamber on the occasion of the sputtering with the Ar gas pressure being set to the range of 1 mTorr to 5 mTorr. Every time before initiating the formation of each of these films, a pre-sputtering was performed for 30 seconds to one minute. The electric power for the sputtering was set to 100 W to 300 W. The formation of each of these films was performed continuously without breaking the vacuum state inside the chamber. The substrate was not cooled in particular.

The domain control film 15 and electrodes 16 were formed by means of a lift-off method which was known in the art. As for the material for the domain control film 15, CoCrPt (20 nm) accompanying an underlayer of Cr (5 nm) was employed. As for the material for the electrode 16, TaW (20 nm)/Ta (100 nm) was employed. These domain control film 15 and electrodes 16 were formed inside the same DC sputtering apparatus without breaking the vacuum state inside the chamber thereof. The sputtering was performed under the conditions of $1\times10^{-7}$ Torr in ultimate vacuum with the Ar gas pressure and electric power being set to 3 mTorr and 300 W, respectively, in the formation of both domain control film 15 and electrodes 16. The deposition of the upper gap insulation film 17 was performed by the same method and under the same conditions as employed in the deposition of the lower gap insulation film. The $Ni_{80}Fe_{20}$ alloy film of the upper shield film 18 was formed a paddle plating method which was known in the art on a sputtered underlayer of $Ni_{80}Fe_{20}$ alloy. During the formation of the upper shield film 18, a magnetic field of 1,900 Oe was applied to the atmosphere.

Figure 3:
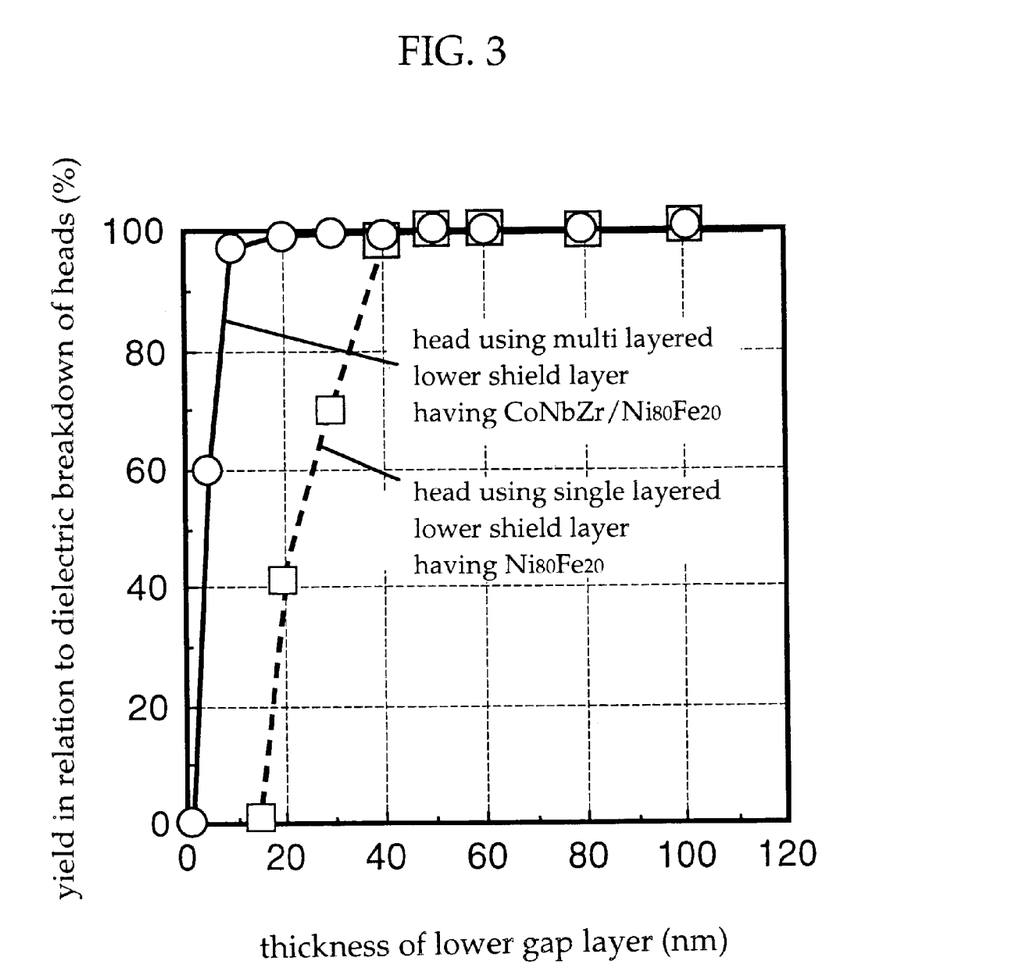
FIG. 3 is a graph illustrating the relationship between the yield relative to the dielectric breakdown of head and the thickness of lower gap insulation film.

Then, the dielectric breakdown voltage of the aforementioned magnetoresistive head shown in FIG. 1 was investigated by applying an electric voltage between the lower shield films 12 and 12' and the magnetoresistive film 14. For the purpose of comparison, the dielectric breakdown voltage of the magnetic head where the lower shield film was constituted by a single layer of $Ni_{80}Fe_{20}$ film was also investigated. FIG. 3 illustrates the dependency of the yield of the element on the thickness (d) of lower gap insulation film as an electric voltage of up to 10V was applied to the magnetoresistive head. In this experiment, the film thickness of the lower shield film 12' was set to 10 nm. As shown in FIG. 3, it was confirmed that according to the magnetoresistive head of the present invention, the ratio in number of the element which was capable of withstanding the application of an electric voltage of 10V was much higher as compared with the magnetic head where the lower shield film was constituted by a single layer of $Ni_{80}Fe_{20}$ film, especially when the film thickness of the lower gap insulation film was 30 nm or less.

Figure 4:
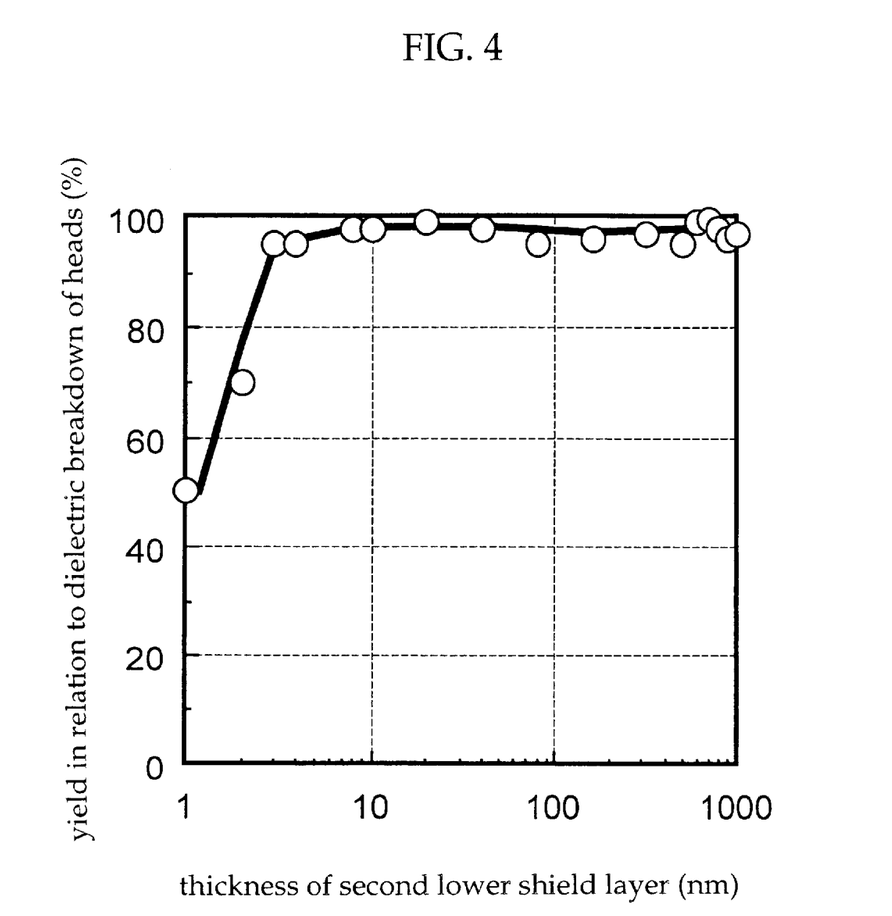
FIG. 4 is a graph illustrating the dependency of the yield relative to the dielectric breakdown of magnetoresistive head on the thickness of a second lower shield film.

FIG. 4 illustrates the dependency of the yield of the element on the thickness (t) of the second shield film as an electric voltage of up to 10V was applied to the magnetoresistive head. In this experiment, the film thickness of the lower gap insulation film was set to 20 nm. As shown in FIG. 4, according to the magnetoresistive head of the present invention, while the yield the element was 95% or more when the film thickness of the second lower shield film 12' was 3 nm or more, the yield of the element was sharply declined as the film thickness of the second lower shield film 12' was less than 3 nm.

Figure 5:
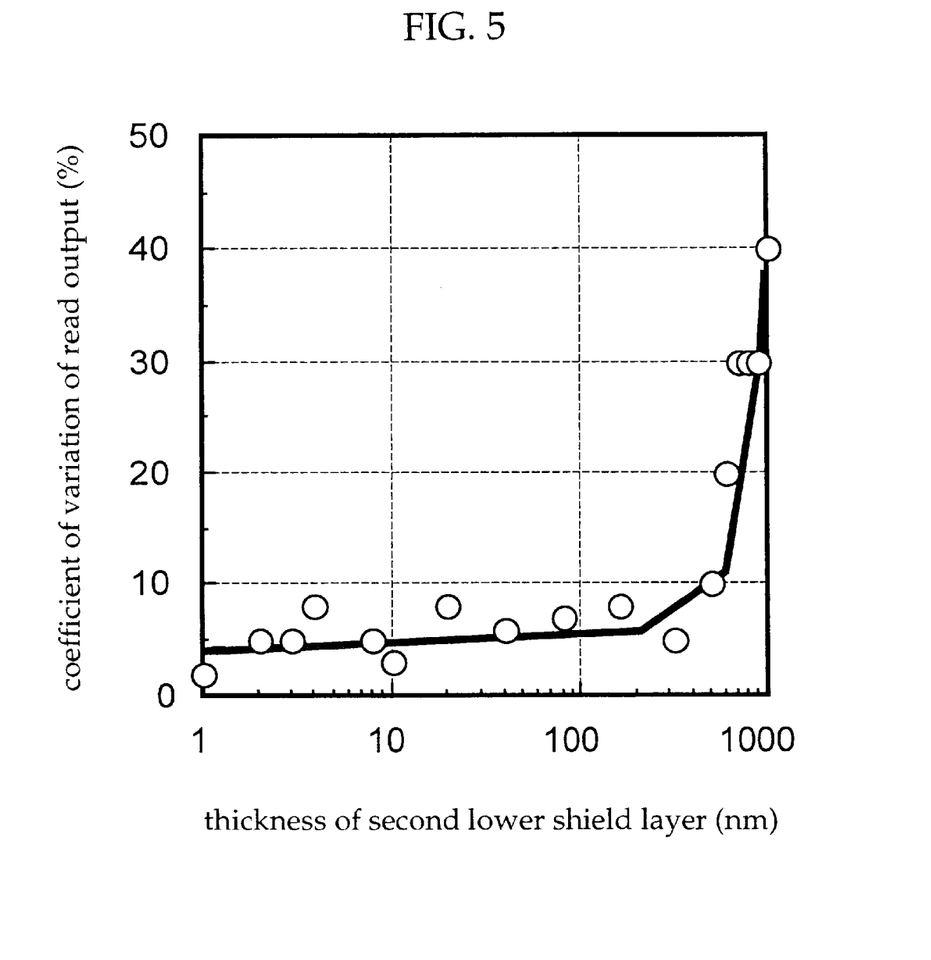
FIG. 5 is a graph illustrating the dependency of the coefficient of variation (%) of read output on the thickness of a second lower shield film.

FIG. 5 illustrates the dependency of the coefficient of variation (%) of read output on the thickness of the second lower shield film in the magnetoresistive head shown in FIG. 1 as the reading and writing were performed 1,000 times. In this experiment, the film thickness of the lower gap insulation film was set to 20 nm. As shown in FIG. 5, according to the magnetoresistive head of the present invention, while the coefficient of variation (%) of read output was suppressed to not higher than 10% when the film thickness of the second lower shield film 12' was 500 nm or less, the fluctuation of read output was sharply increased as the film thickness of the second lower shield film 12' was increased to exceed 500 nm.

Table 1 shows the yield of the element relative to the dielectric breakdown as the second lower shield film and the lower gap insulation film were variously combined in the magnetoresistive head shown in FIG. 1. In this case, the film thickness of the lower gap insulation film was set to 20 nm, while the film thickness of the second lower shield film was set to 10 nm. As shown in Table 1, an improvement on the dielectric breakdown was recognized where the second lower shield film was constituted by a Co-based amorphous film such as CoTaZr, CoNbZr, CoMoZr, CoTaHf, CoNbHf and CoMoHf. Whereas, when the second lower shield film was constituted by a crystalline film such as Co and CoFe, the effect thereof on the improvement of dielectric breakdown was not recognized. As for the lower gap insulation film, almost the same effects were recognized when the lower gap insulation film was constituted by $Al_2O_3$ or $SiO_2$.

TABLE 1

| 2nd Lower Shield | Lower Gap | Yield |
|---|---|---|
| CoNbZr (amorphous) | $Al_2O_3$ | 97% |
| CoNbZr (amorphous) | $SiO_2$ | 97% |
| CoNbZr (amorphous) | $Al_2O_3$—$SiO_2$ | 98% |
| CoTaZr (amorphous) | $Al_2O_3$ | 95% |
| CoTaZr (amorphous) | $SiO_2$ | 96% |
| CoTaZr (amorphous) | $Al_2O_3$—$SiO_2$ | 98% |
| CoMoZr (amorphous) | $SiO_2$ | 95% |
| CoMoZr (amorphous) | $Al_2O_3$—$SiO_2$ | 97% |
| CoTaHf (amorphous) | $Al_2O_3$—$SiO_2$ | 99% |
| CoTaHf (amorphous) | $Al_2O_3$—$SiO_2$ | 98% |
| CoTaHf (amorphous) | $Al_2O_3$—$SiO_2$ | 98% |
| Co (crystalline) | $Al_2O_3$ | 45% |
| Co (crystalline) | $SiO_2$ | 40% |
| Co (crystalline) | $Al_2O_3$—$SiO_2$ | 35% |
| CoFe (crystalline) | $Al_2O_3$ | 46% |
| CoFe (crystalline) | $SiO_2$ | 40% |
| CoFe (crystalline) | $Al_2O_3$—$SiO_2$ | 41% |

As shown above, it will be understood that due to the 2-ply structure of the lower shield film as explained above, it becomes possible to obtain composite effects, i.e. the effect of the first lower shield film 12 to minimize the output fluctuation of the magnetoresistive head, and the effect of the second lower shield film 12' to improve the dielectric breakdown of the lower gap insulation film 13. Further, the effect of the second lower shield film 12' may be attributed to the fact that when this second lower shield film 12' is constituted by a Co-based amorphous film, a reaction between Co and the gap insulation film is allowed to take place to thereby densify the initial growth layer of the gap insulation film, thus making it possible to form a high-quality gap insulation film reflecting the flatness of the surface of the amorphous film.

EXAMPLE 2

A read/write separation type head comprising a combination of the magnetoresistive head which was manufactured in Example 1 and a recording head (an inductive thin film head) was manufactured.

Figure 6:
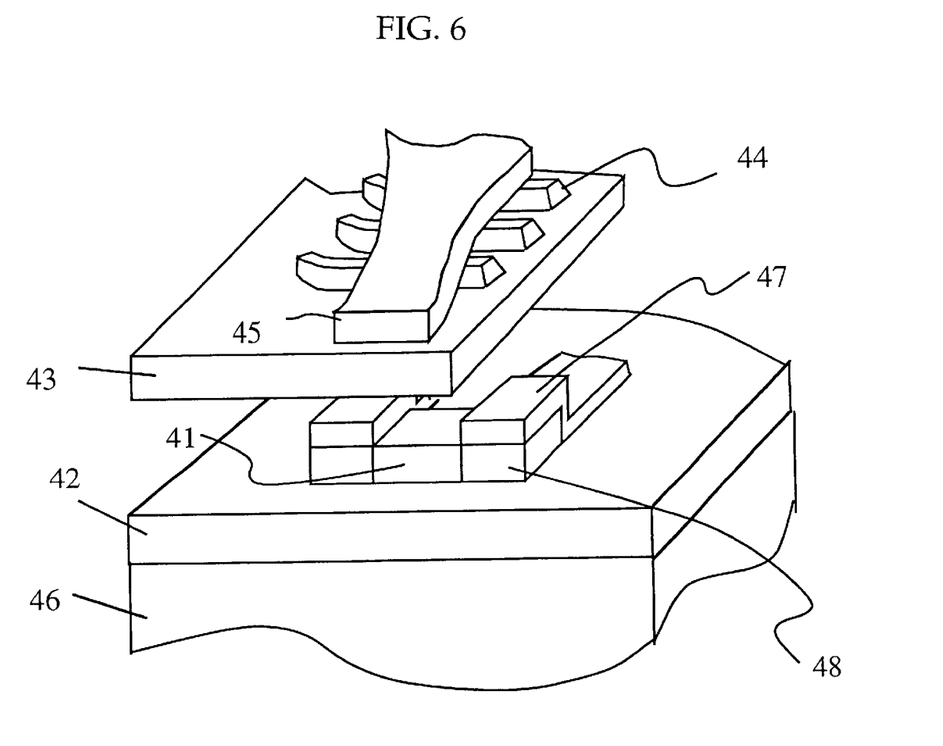
FIG. 6 is a perspective view of the read/write separation type head comprising a combination of the magnetoresistive head of the present invention and a recording head.

FIG. 6 is a perspective partially cut view of the read/write separation type head. This head was constructed such that a lower shield film 42 was formed on a substrate 46, and a magnetoresistive film 41 was interposed between the lower shield film 42 and an upper shield film 43. A domain control film 48 was formed on both sides of the magnetoresistive film 41, and an electrode 47 was formed on each of the domain control films 48. The portion between the lower shield film 42 and the upper shield film 43 was employed to function as a read head, the construction of which was the same as that of Example 1. The lower magnetic pole of the recording head was constituted by the upper shield film 43 of the read head. The coil 44 and upper magnetic pole 45 of the recording head were formed of a Cu film and a Ni(46%)-Fe film, respectively, which were manufactured by means of electroplating method. The magnetic gap insulation film and protective film of the recording head were both formed of $Al_2O_3$ film. The width of track of the recording head was set to 0.4 μm, while the width of track of the read head was set to 0.3 μm.

According to the magnetic head of the present invention, since the lower gap insulation film is formed of a magnetic gap insulation film exhibiting a high dielectric breakdown voltage as compared with the magnetic head employing the conventional lower shield film, it is possible to manufacture the magnetic head at high yield. Furthermore, since the length of gap of the read head can be shortened, a high recording density can be realized.

EXAMPLE 3

Figure 7A:
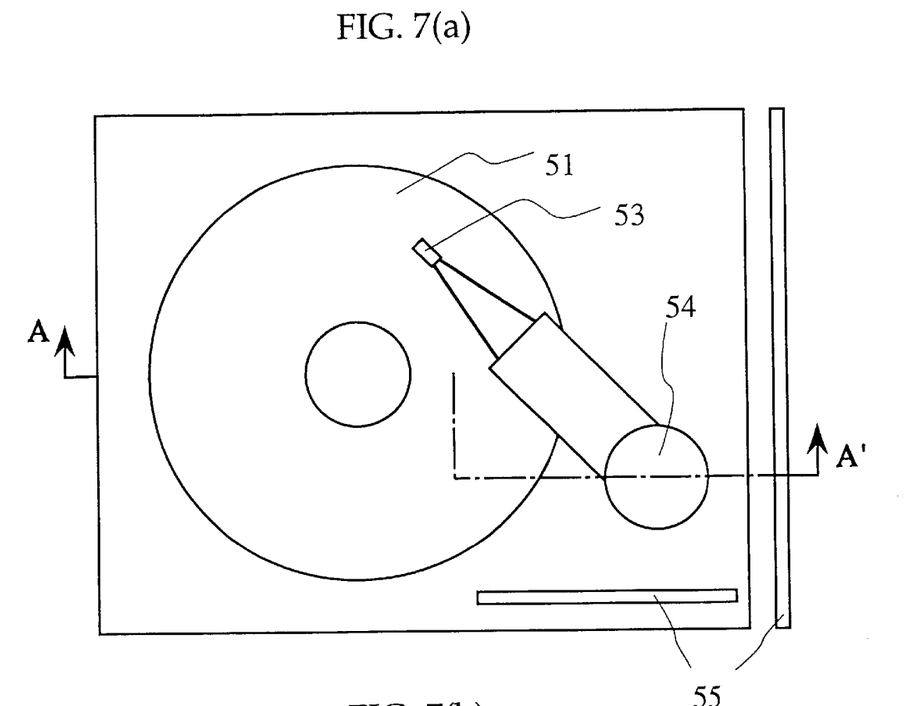
FIGS. 7(a) and 7(b) are schematic views illustrating a magnetic storage apparatus employing the read/write separation type head of the present invention.
Figure 7B:
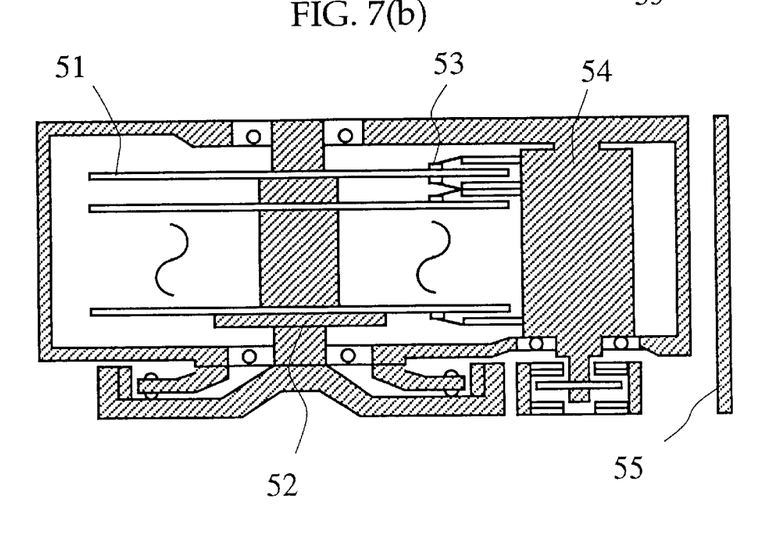

A magnetic storage apparatus was manufactured by making use of the read/write separation type head of the present invention. In FIG. 7, a schematic view of the structure of the magnetic storage apparatus is shown, wherein FIG. 7(a) shows a plan view of the magnetic storage apparatus, and FIG. 7(b) is a cross-sectional view taken along the line A–A' in FIG. 7(a).

This magnetic storage apparatus is constructed, as in the case of the conventional apparatus, such that it comprises a disk-like magnetic recording medium 51 having a recording magnetic film and being designed to be rotated about the central axis thereof; a magnetic head 53 for reading and writing data through said magnetic recording medium; a mechanism for positioning the magnetic head 53 to a desired diametral portion over said magnetic recording medium while supporting the magnetic head 53; and a read/write signal processing system 55 for processing read signals and write signals.

The magnetoresistive head 51 is fixed to the driving portion 52 of magnetic recording medium so as to be rotated by this driving portion 52. The magnetic head 53 is supported on a suspension which is supported on an arm, which is fixed to a magnetic head driving portion 54. The magnetic head 53 is designed to be positioned at a desired position over the magnetoresistive head 51 through the rotation of magnetic head driving portion 54. The read/write signal processing system 55 is designed to record a data by passing a recording current to the magnetic head 53 and to convert the data by processing the electric signals obtained from the magnetic head 53. The recording of data can be performed by reversing the magnetization direction of the magnetic film on the magnetic recording medium. The read back of data is performed by detecting the leak magnetic field generated from the magnetic recording medium by making use of the read head and then by converting the leak magnetic field into electric signals.

As for the material for the magnetoresistive head 51, a magnetic recording material consisting of Co—Cr—Pt-based alloy having a coercive force of 4,500 Oe was employed. The read head in the magnetic head 53 was formed of the 2-ply lower shield film of Example 1, thereby making it possible to manufacture a magnetic head at a sufficiently higher yield even if the length of gap of the read head was set to not more than 70 nm as compared with the magnetic head employing the conventional NiFe single-layer lower shield film. Since the length of gap of the read head can be shortened as mentioned above, it is possible to manufacture a magnetic recording disk drive having a high linear recording density. In this example, the width of track of read head was set to 0.28 μm, the length of gap of the read head was set to 70 nm, and the width of track of recording head was set to 0.28 μm, thereby realizing 67 kBPI (Bit Per Inch) in linear recording density, 60 kTPI (Track Per Inch), and hence 40.2 $Gbit/in^2$ in in-plane recording density. Therefore, it is considered that the employment of the magnetoresistive head of the present invention is imperative for a magnetic storage apparatus having a recording density of 40 $Gbit/in^2$ or more.

According to the present invention, it is now possible to provide a magnetic head which is substantially free from fluctuations of read output and is capable of coping with a high recording density, without deteriorating the yield thereof even if the gap is narrowed. Additionally, it is possible to obtain a high-performance magnetic storage apparatus by making use of the aforementioned magnetic head.

What is claimed is:

1. A magnetoresistive head, comprising:
   a magnetoresistive film;
   a pair of electrodes connected to both sides of said magnetoresistive film;
   upper and lower gap insulation films sandwiching said magnetoresistive film therebetween;
   an upper shield film formed on said upper gap insulation film;
   a lower shield film formed below said lower gap insulation film;
   said lower shield film including:
   an amorphous soft magnetic film which is disposed contacting with said lower gap insulation film; and
   a crystalline soft magnetic film which is disposed away from said lower gap insulation film,
   wherein a thickness of the amorphous soft magnetic film is not more than 500 nm.

2. The magnetoresistive head according to claim 1, wherein said amorphous soft magnetic film is an amorphous film containing Co as a main component.

3. The magnetoresistive head according to claim 2, wherein said crystalline soft magnetic film is a crystalline film containing Ni and/or Fe as a main component.

4. The magnetoresistive head according to claim 2, wherein the film thickness of said lower gap insulation film is not more than 30 nm.

5. The magnetoresistive head according to claim 1, wherein said crystalline soft magnetic film is a crystalline film containing Ni and/or Fe as a main component.

6. The magnetoresistive head according to claim 5, wherein the film thickness of said lower gap insulation film is not more than 30 nm.

7. The magnetoresistive head according to claim 1, wherein the film thickness of said lower gap insulation film is not more than 30 nm.

8. A magnetoresistive head according to claim 1, wherein a thickness of the amorphous soft magnetic film is not less than 3 nm.

9. A magnetic storage apparatus, comprising:
   a magnetic recording medium;

a magnetic head including a read head and a write head;

a mechanism for positioning said magnetic head to a desired position on the magnetic medium, and for supporting the magnetic head;

a read/write signal processing system;

said read head comprising:
- a magnetoresistive film;
- a pair of electrodes connected to both sides of said magnetoresistive film;
- upper and lower gap insulation films sandwiching said magnetoresistive film therebetween;
- an upper shield film formed on said upper gap insulation film;
- a lower shield film formed below said lower gap insulation film;
- said lower shield film including:
  - an amorphous soft magnetic film which is disposed contacting with said lower gap insulation film; and
  - a crystalline soft magnetic film which is disposed away from said lower gap insulation film,
  - wherein a thickness of the soft amorphous film is not more than 500 nm.

10. The magnetic storage apparatus according to claim 9, wherein said amorphous soft magnetic film in said read head is an amorphous film containing Co as a main component.

11. The magnetic storage apparatus according to claim 9, wherein said crystalline soft magnetic film in said read head is a crystalline film containing Ni and/or Fe as a main component.

12. The magnetic storage apparatus according to claim 9, wherein the film thickness of said lower gap insulation film in said read head is not more than 30 nm.

13. A magnetic storage apparatus according to claim 9, wherein a thickness of the amorphous soft magnetic film is not less than 3 nm.

* * * * *